United States Patent [19]
Schaffner et al.

[11] Patent Number: 5,291,565
[45] Date of Patent: Mar. 1, 1994

[54] BROAD BAND, LOW POWER ELECTRO-OPTIC MODULATOR APPARATUS AND METHOD WITH SEGMENTED ELECTRODES

[75] Inventors: James H. Schaffner, Chatsworth; William B. Bridges, Pasadena, both of Calif.

[73] Assignee: Hughes Aircraft Company, Los Angeles, Calif.

[21] Appl. No.: 906,788

[22] Filed: Jun. 30, 1992

[51] Int. Cl.5 .............................................. G02B 6/10
[52] U.S. Cl. .............................................. 385/3
[58] Field of Search ....................... 385/1-5; 359/251

[56] References Cited

U.S. PATENT DOCUMENTS

| | | | |
|---|---|---|---|
| 4,709,978 | 12/1987 | Jackel | 385/3 |
| 5,005,932 | 4/1991 | Schaffner et al. | 385/3 |
| 5,076,655 | 12/1991 | Bridges | 385/3 X |
| 5,091,981 | 2/1992 | Cunningham | 385/3 |
| 5,101,450 | 3/1992 | Olshansky | 385/3 |
| 5,109,441 | 4/1992 | Glaab | 385/3 X |
| 5,138,480 | 8/1992 | Dolfi et al. | 385/3 X |

OTHER PUBLICATIONS

Bridges, et al., "Wave-Coupled LiNbO3 Electroptic Modulator for Microwave and Millimeter-Wave Modulation," *IEEE Photonics Technology Letters*, vol. 3, No. 2, Feb., 1991, pp. 133-135.

Ha, Solid State Microwave Amplifier Designs, John Wiley & Sons, Inc., 1981, pp. 248-260.
C. M. Gee et al., "Traveling-wave electrooptic modulator", *Applied Physics*, vol. 22, No. 13, Jul. 1, 1983, pp. 2034-2037.
D. W. Dolfi, "Traveling-wave 1-3 μm interferometer modulator with high bandwidth, low drive power, and low loss", Applied Optics, vol. 25, No. 15, Aug. 1, 1986, pp. 2479-2480.

*Primary Examiner*—Akm E. Ullah
*Attorney, Agent, or Firm*—V. D. Duraiswamy; W. K. Denson-Low

[57] ABSTRACT

An electro-optic modulator such as a Mach-Zehnder interferometer has a segmented optical transmission network with a series of discrete electrodes for successive segments of the network. Respective modulating signals are supplied to the electrodes along transmission lines whose lengths differ from each other, so that modulating signals applied to the inputs of the transmission lines arrive at their respective electrodes in synchronism with the propagation of an optical signal through the optical transmission network. The modulating transmission lines are disposed lateral to and generally coplanar with the optical transmission network, preferably on a separate substrate. The desired differential in transmission line lengths can be achieved by positioning the input ends of the transmission lines along an edge of the input substrate that is at a desired angle to the optical transmission network.

23 Claims, 4 Drawing Sheets

BROAD BAND, LOW POWER ELECTRO-OPTIC MODULATOR APPARATUS AND METHOD WITH SEGMENTED ELECTRODES

BACKGROUND OF THE INVENTION

1. Field of the Invention

This invention relates to electro-optic modulators in which an optical signal is modulated by an electrical signal, and more particularly to modulators in which segmented modulating electrodes are distributed along an optical network.

2. Description of the Related Art

A trade off must normally be made between bandwidth and power when designing an electro-optic modulator that has an extended optical transmission network, such as a Mach-Zehnder interferometer. Longer modulators result in a narrower bandwidth, while shorter modulators have a greater power consumption.

At frequencies above 2 GHz, the electric signal propagates along with the optical signal down the length of the modulator. This allows the electric signal to interact with the optical signal over the length of the modulator. The reason for the reduction in bandwidth in these traveling wave modulators as the modulator length increases is that the propagation speed of the electrical radio frequency (RF) modulating signal is less than the optical propagation speed through the modulator. The modulator operation begins to degrade when the two signals go more than 180° out of phase with each other before the end of the modulator; the amount of phase differential is proportional to the modulator length. Since RF signals have shorter wavelengths at higher frequencies, and therefore go out of phase with the optical signal more rapidly at such frequencies, longer modulators encounter a high frequency bandwidth limitation.

The additional power requirement of a shorter modulator is related to the depth of modulation, which is the ratio of the difference in optical output intensity between the positive and negative RF peaks (the RF signal normally rides on a DC bias), divided by the maximum optical output intensity with zero modulation. The depth of modulation is directly proportional to the modulation drive voltage times the length of the modulator. It decreases as the modulator length is reduced, since the interaction length of the RF and optical signals is reduced. Accordingly, a stronger modulation drive (i.e., greater RF voltage) is required to maintain the same depth of modulation for a shorter modulator. The power required to produce a given depth of modulation varies inversely with the square of the modulator length.

An extended modulator length with a consequent reduction in the RF drive power is disclosed in Schaffner et al. U.S. Pat. No. 5,005,932, issued Apr. 9, 1991 and assigned to Hughes Aircraft Company, the assignee of the present invention. In this approach a periodic electrode structure is used to match the velocity of the optical signal with that of the dominant RF space harmonic. The RF optical signals are perfectly coherent at one frequency so that the modulator response is high at the design frequency, but away from this frequency the modulator response decreases. The frequency response is thus quite limited.

Another time delay modulator is described in Bridges U.S. Pat. No. 5,076,655, issued Dec. 31, 1991 and assigned to Hughes Aircraft Company, and in Bridges et al., "Wave-Coupled LiNbO$_3$ Electroptic Modulator For Microwave and Millimeter-Wave Modulation", *IEEE Photonics Technology Letters*, Vol. 3, No. 2, February 1991, pages 133–135. The electrodes of an electro-optic modulator are divided into short sections, with each section connected to its own antenna on the surface of a common substrate. The antennas are then illuminated from the underside of the substrate by a plane wave that is transmitted through the substrate at an angle to the modulator surface; the angle is chosen so that the phase velocity of the incident modulating wave in the direction of the optical waveguide is equal to that of the optical wave. Each antenna thus receives the proper phase to match the phase velocity of the optical wave. Phase errors are kept small by making the sections short, while power requirements are limited because of the extended length of the overall modulator. A simple phase modulator was disclosed, but the same approach was said to work if applied to one arm of a Mach-Zehnder amplitude modulator.

While the modulator described in the Bridges et al. article achieves a desirable combination of relatively broadband operation coupled with a relatively low power consumption, it requires the presence of an RF transmission antenna on the underside of a LiNbO$_3$ substrate. The substrate material has a large RF index of refraction, and the receiver antennas therefore collect the RF signal more efficiently than would be the case if the signals were transmitted through the air. The result is a bulky three-dimensional structure that requires a large quantity of relatively expensive LiNbO$_3$. In addition, the angle of the transmission antenna to the LiNbO$_3$ substrate is critical and would be difficult to maintain in a system subject to environmental conditions other than those found in the laboratory.

SUMMARY OF THE INVENTION

The present invention seeks to provide a segmented electro-optic modulator and method that combines a broadband capability with a low power requirement, and yet is compact and does not use large quantities of expensive substrate material. In addition, the modulator is planar, and therefore utilizes microwave integrated circuit technology which allows the modulator to be contained within a rugged package.

To accomplish these goals, an optical transmission network is provided on a substrate along with respective electrodes for successive segments of the network. Electrical transmission lines are disposed lateral to the optical transmission network to transmit electrical modulating signals to respective electrodes, and thereby modulate an optical signal that is transmitted through the optical network. The lengths of the electrical transmission lines are selected so that electrical signals applied to their input ends with a predetermined phase relationship reach their respective electrodes in synchronism with the propagation of an optical signal through the optical transmission network.

The electrical transmission lines, which feed the RF signal to the modulator electrodes, are preferably microstrip lines for frequencies less than 65 GHz and slotlines for frequencies greater than 65 GHz. They can be provided on a separate substrate from the optical network substrate along the optical network the electrical lines comprising the electrode are generally coplanar with the optical network. Electrical connector lines extend from the electrodes along the optical substrate, and are electrically coupled to the electrical transmission lines on the other substrate.

The electrical transmission lines of the RF feed network are preferably parallel, and extend to an edge of the substrate upon which they are formed. That edge of the substrate is cut at an angle to the optical transmission network that gives each electrical transmission line the appropriate length for synchronizing the electrical modulating signals with the optical signal in the network. The separate transmission lines may either be connected to respective RF transmitters, or connected together to a common RF transmitter with the transmitted RF signal split among the various lines; in this sense the RF "transmitter" transmits the signal into the modulator.

When applied to a Mach-Zehnder interferometer, the electrodes are disposed between parallel optical lines of the interferometer as substantially coplanar extensions of the electrical transmission lines. The electrical and optical lines are separated at optical line crossovers by an insulating material that prevents the optical signal from dissipating into the electrical line.

The provision of lateral electrical feed lines that are generally coplanar with the optical transmission network results in a more compact structure, while the provision of a separate substrate for the electrical lines makes it possible to use less expensive materials. Segmenting the modulator, along with selecting the lengths of the electrical transmission lines to synchronize the delivery of modulating signals to the propagation of an optical signal from segment to segment, results in a broadband modulator with a low power requirement.

These and other features and objects of the invention will be apparent to those skilled in the art from the following detailed description, taken together with the accompanying drawings.

DETAILED DESCRIPTION OF THE INVENTION

Figure 1:
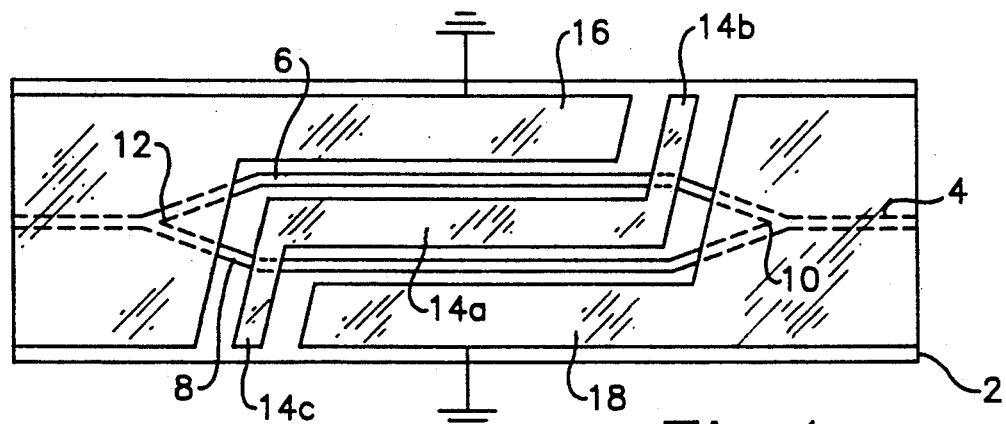
FIG. 1 is a plan view of a conventional traveling wave Mach-Zehnder interferometric integrated optical modulator.

A conventional traveling wave Mach-Zehnder interferometric integrated optic modulator is illustrated in FIG. 1. It is fabricated on a lithium niobate (LiNbO3) substrate 2 by the diffusion of strips of titanium 4 into the substrate by conventional techniques to form optical waveguide channels. This type of structure is described, for example, in C. M. Gee et al., "Traveling-wave electrooptic modulator", *Applied Physics*, Vol. 22, No. 13, Jul. 1, 1983, pages 2034-2037, and in D. W. Dolfi, "Traveling-wave 1.3 μm interferometer modulator with high bandwidth, low drive power, and low loss", *Applied Optics*, Vol. 25, No. 15, Aug. 1, 1986, pages 2479-2480. An optical signal enters the modulator at one end and splits between the device's two arms 6 and 8 at an input Y-junction 10.

Since LiNbO3 is an electro-optic material, when an electric field is applied across the optical waveguide the optical index of refraction changes in direct proportion to both the strength of the electric field and the magnitude of the electro-optic coefficient of the material in the direction of the electric field. This in turn causes the optical signal to be phase modulated in each arm of the interferometer; the modulation occurs in opposite directions because the electric field is in opposite directions for each arm. The phase modulation is converted to amplitude modulation at the interferometer's output Y-junction 12 through interference between the optical fields in each arm. The modulating electric field is provided by metal electrodes that include a center electrode 14a between the optical arms 6 and 8, and a pair of ground conductors 16 and 18 on opposite sides of the arms 6 and 8. A modulating signal $V_{mod}$ is applied to the center electrode 14a via an input electrode 14b, propagates along the modulator in the same direction as the optical signal, and then exits through an exit electrode 14c into a termination (not shown). The electrodes are typically printed circuits that are generally made of gold and deposited onto the substrate following a photolithographic pattern definition. In FIG. 1 the modulator is fabricated with an X-cut LiNbO3 substrate; a modulator using Z-cut LiNbO3 would be similarly fabricated, except one electrode would be placed directly over each optical arm to take advantage of the optimum electro-optic coefficient.

The 3 dB rolloff frequency for the traveling wave modulator of FIG. 1 is:

$$f_{3dB} = \frac{1.4c}{\pi |N_o - N_m| L}$$

where c is the free space speed of light, L is the modulator length, and $N_o$ and $N_m$ are the optical and RF indexes of refraction, respectively. In LiNbO3 modulators $N_o = 2.2$, while for coplanar waveguide electrodes on LiNbO3 $N_m = 4.2$. Thus, for example, if $f_{3db} = 100$ GHz, then L=0.66 mm. Since the depth of modulation varies with L, if a 3.5 mm long modulator requires 15 dBm of drive power for a 50% depth of modulation, then a 0.66 mm long modulator would need 29.5 dBm (nearly 1 Watt) for the same depth of modulation. This would be a very inefficient operation.

Figure 2:
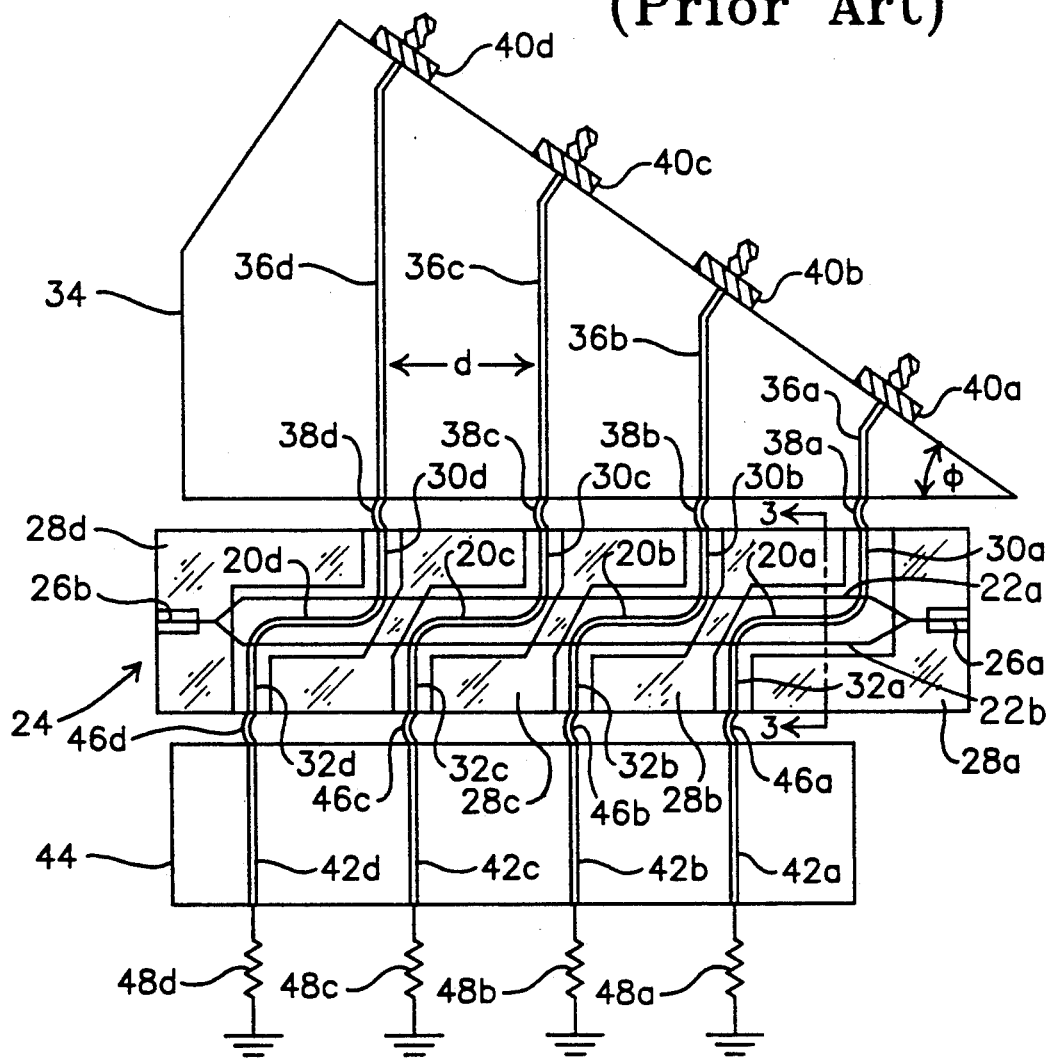
FIG. 2 is a plan and partially schematic view of a March-Zehnder interferometer in accordance with the invention.

The approach taken by the invention to increase the modulator's efficiency without sacrificing bandwidth, yet still retain a compact essentially two-dimensional structure, is shown in FIG. 2. In this approach the modulator is segmented, with a series of discrete center electrodes 20a, 20b, 20c and 20d substituted for the single center electrode of FIG. 1. Although four electrodes are illustrated, any desired number could be provided. The length of each individual electrode is limited so that it has a high associated bandwidth; the bandwidth of the overall modulator is determined by the lengths of its individual electrodes, not by the modulator's aggregate length. On the other hand, as demonstrated below the modulator's overall efficiency is significantly higher than the efficiency of any individual segment.

An optical waveguide is divided into two arms 22a and 22b on the same substrate 24 as the electrodes 20a–20d, with the optical arms extending continuously on opposite sides of the electrodes. The optical arms are joined at input and output Y-junctions into input and output waveguides 26a and 26b, respectively.

The substrate surface is coated with ground plane electrode 28a–28d surrounding the center electrodes 20a–20d and optical arms 22a and 22b, with gaps left in the ground plane electrode for the input and output waveguides 26a, 26b and for RF connector feeds to the center electrodes. The electrodes are typically formed from gold about 2.5 microns thick, while the substrate is again typically LiNbO$_3$ and the waveguides titanium diffused into the LiNbO$_3$. The center electrodes 20a–20d are preferably implemented as lines that are formed integrally with laterally extending input connector lines 30a–30d at one end of the respective electrodes and RF output lines 32a–32d at the opposite ends of the respective electrodes.

A separate substrate 34 is preferably provided lateral to the interferometer substrate 24 to provide a base for electrical transmission microstrip lines 36a, 36b, 36c and 36d. These lines are used to feed the center electrodes 20a–20d with RF power, and to provide phase synchronization between the RF power supply and the optical signal propagating through the modulator. Since the transmission line substrate 34 does not carry any optical waveguides, it can be formed from materials such as alumina or quartz, which are better microwave substrates and are considerably less expensive than the LiNbO$_3$ substrate 24 used for the optical portion of the modulator. While the transmission line substrate 34 could be fabricated integrally with and from the same material as optical substrate 24, this would alter the microstrip transmission properties and would also require a greater use of the relatively expensive LiNbO$_3$ optical substrate material. The microstrip RF feed lines 36a–36d are preferably formed from the same material and with the same dimensions as the center electrodes 20a–20d. The two substrates 24 and 34 are held together side-by-side by a suitable fixture (not shown) to which the substrates are cemented, with gold bonded wire jumpers 38a–38d connecting the RF microstrip lines 36a–36d to their respective electrode connector lines 30a–30d. The electrode grounds 28a–28d are connected to the microstrip lines' ground under the microstrip substrates 34, 44 by wrapping the electrode around the edge of the substrate 24.

Millimeter wave RF signals are supplied to the transmission lines 36a–36d from respective coaxial cables (not shown) through respective coaxial-to-microstrip line adapters 40a–40d. These could be implemented as K-connector ® adapters up to 40 GHz or V-connector ® adapters up to 65 GHz, supplied by the Wiltron Company. For frequencies higher than 65 GHz, RF receivers such as those illustrated in FIGS. 6 and 7 (discussed below) are used.

Microstrip termination lines 42a–42d are fabricated on a separate alumina or quartz substrate 44 that is coplanar with optical substrate 24, on the opposite side from the input transmission line substrate 34. The output lines 42a–42d are connected on one side via wire jumpers 46a–46d to the output electrode connector lines 32a–32d on the optical substrate 24, and on their opposite sides to respective termination resistors 48a–48d. As with the input transmission substrate 34, output substrate 44 could be formed integrally with the optical substrate 24, but a separate member of less expensive material is preferred.

In FIG. 2 it is assumed that an RF signal has been previously divided by a coaxial power splitter (not shown), and that the phase of each RF signal entering the adapters 40a–40d is equal. However, the invention is also applicable to situations in which the RF signals for the various input transmission lines are out of phase with each other, so long as the initial phase differences are known. Input transmission lines 36a–36d preferably extend parallel to each other in a lateral direction away from the center electrodes 20a–20d. The length of each input transmission line is selected to delay its respective RF signal so that the various input RF signals reach their respective modulator segments in synchronism with the arrival of an optical waveguide signal at the same segments. In other words, each successive transmission line 36a–36d is made longer than the previous line so that its RF signal has a longer delay, and therefore reaches its respective electrode slightly after the preceding electrode has been energized with an RF signal. The transmission line length differentials are selected so that the incremental RF signal delay for each successive electrode matches the time required for the optical signal to travel between successive electrodes.

The input transmission lines 36a–36d could be formed in wandering paths on input substrate 34 to achieve the desired differential lengths. Preferably, however, the transmission lines are parallel and the substrate 34 is cut into a generally wedge shape. An angle $\phi$ is formed between the edge of substrate 34 that runs parallel to the optical substrate 24, and the opposite edge of substrate 34 that bears the coaxial-to-microstrip adapters 40a–40d. If the distance between successive modulating electrodes is d, then the time t required for the optical signal to travel from one modulator to the next is:

$$t = \frac{2.2d}{c}.$$

To match this time delay, each RF microstrip line 36b–36d must be longer than the preceding line by:

$$ad = d\tan\phi = v_{RF}t$$

where $v_{RF}$ is the phase velocity of the RF signal on the microstrip lines. The angle $\phi$ at which the input substrate is cut is therefore defined by:

$$\tan\phi = \frac{2.2}{\sqrt{\epsilon_{RF}}}$$

where $\epsilon_{RF}$ is the effective RF dielectric constant for the microstrip. With an alumina substrate $\epsilon_{RF}=9.9$ and $\phi=35°$, while for quartz substrate $\epsilon_{RF}=3.8$ and $\phi=48°$. Adjustments to these angles would be made for variations of $\epsilon_{RF}$ due to the thickness of the microstrip substrate and the width of the microstrip lines.

The time delay in the described modulator is extremely broadband, varying only as the relatively small dispersion in the microstrip line. The modulator's efficiency, measured as the depth of modulation M, is proportional to the drive voltage V, which in turn is proportional to the square root of the RF power delivered to each electrode 20a–20d. Assuming the modulator has N electrodes, the total RF power $P_{RF}$ is divided N ways, so that the modulating voltage on each electrode is proportional to $\sqrt{P_{RF}/N}$. The modulator's overall efficiency $M_o$ for an array of N electrodes is thus equal to $\sqrt{N} M_S$, where $M_S$ is the depth of modulation for a single electrode.

Figure 3:
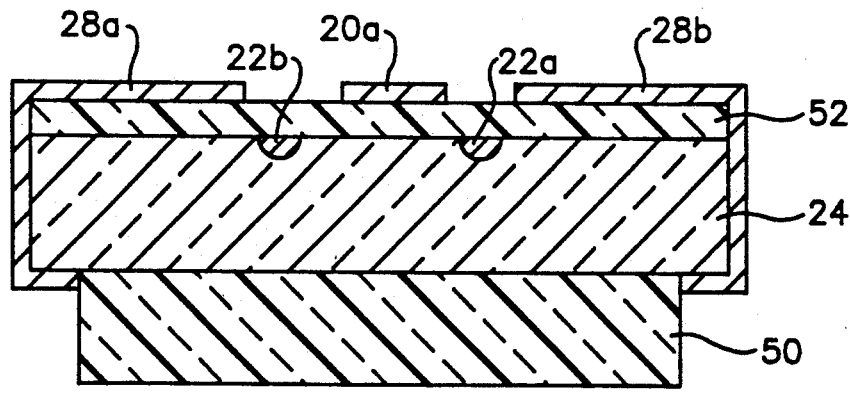
FIG. 3 is a sectional view, not to scale, take along the section line 3—3 of FIG. 2.

FIG. 3 is a sectional view of the modulator substrate 24, taken along the section line 3—3 in FIG. 2. The ground plane electrodes 28a, 28b are shown wrapping around the edges of the substrate to make electrical contact to the microstrip line ground. The LiNbO$_3$ substrate 24 is cemented to a non-metallic support block 50. Instead of wrapping around the edges of the substrate 24, the ground electrodes 28a, 28b could be connected to the ground plane through conductive vias that extend through the substrate.

A buffer layer 52 of a suitable insulator material such as SiO$_2$ separates the electrode 28a, 28b from the underlying waveguide 22a, 22b. The buffer layer's dielectric constant is selected so that the optical signal propagating along the waveguide undergoes total internal reflection at the buffer layer interface, and is thereby prevented from leaking into the electrode. In practice it is convenient to form a blanket buffer layer over the entire area of substrate 24, but if desired the buffer layer could be etched away except where it separates the electrodes from the waveguides. A thickness of about 1,500–10,000 Angstroms is preferred for the buffer layer; a thinner buffer can lead to optical losses into the electrodes, while thicker layers can move the RF electrodes signal too far from the waveguides.

Figure 4:
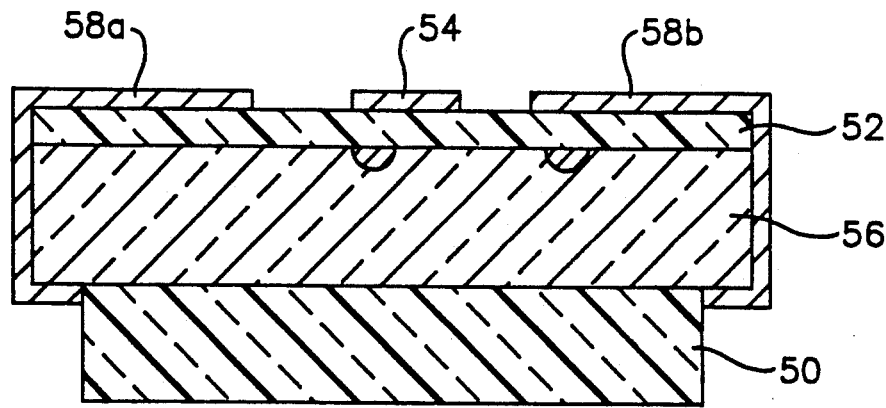
FIG. 4 is a sectional view, not to scale, of another Mach-Zehnder inferferometer in accordance with the invention with a different substrate.

The structure described thus far preferably uses an X-cut LiNbO$_3$ optical substrate 24. A Z-cut LiNbO$_3$ optical substrate can also be used, as illustrated in FIG. 4. In this case an RF electrode 54 would be located over one of the waveguides 22b in the Z-cut substrate 56, while ground plane electrodes 58a, 58b would be positioned over the other waveguide 22a.

Figure 5:
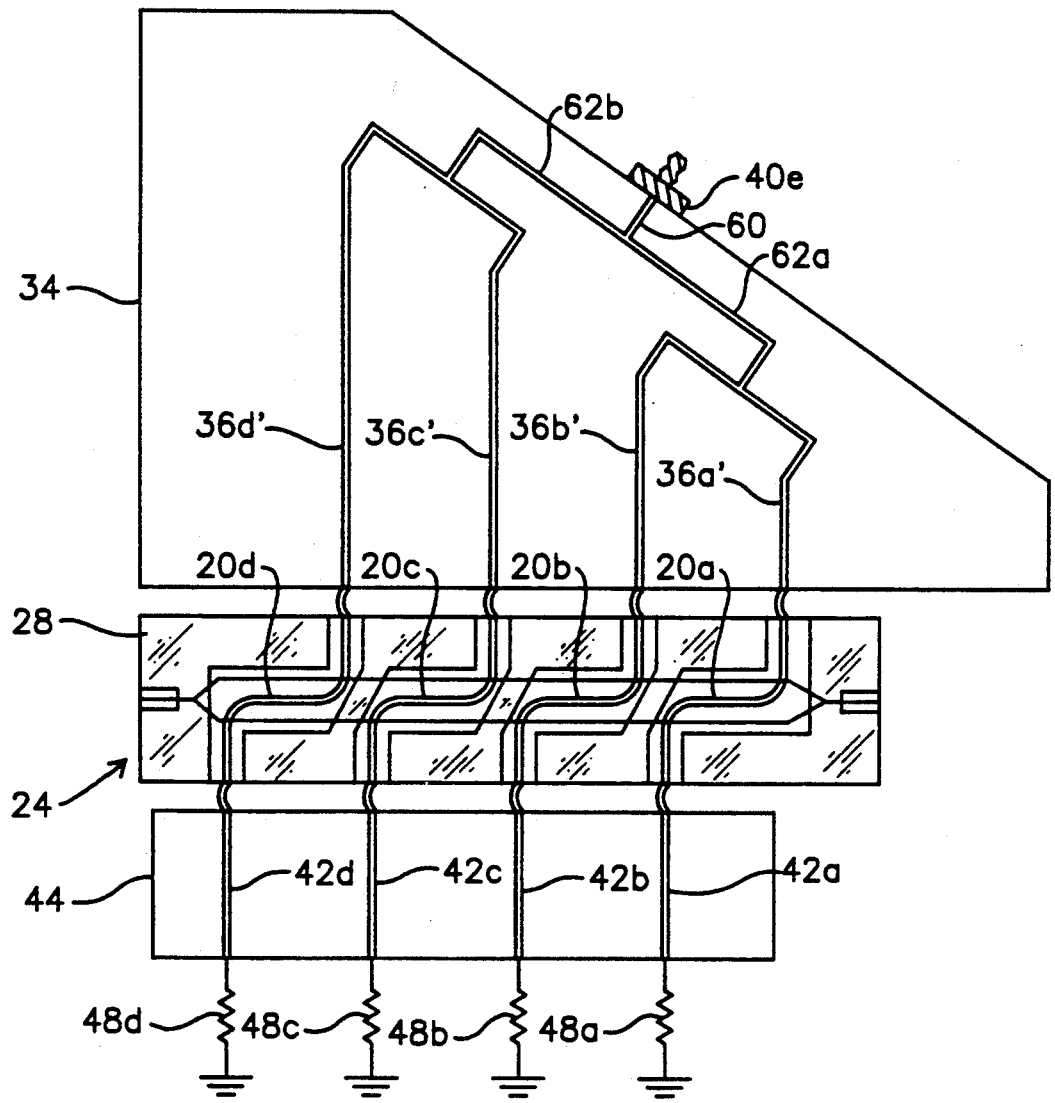
FIG. 5 is a plan view of an embodiment of the invention similar to FIG. 2, but with a common electrical feed.

A modulator that employs a single coaxial-to-microstrip adapter 40e is shown in FIG. 5. In this embodiment the RF signal is divided by a corporate feed structure 40 into separate signals for each electrode. With four segments in the illustration of FIG. 5, a single RF input microstrip line 60 receives the RF signal from adapter 40e and divides into a pair of microstrip lines 62a and 62b, which in turn divide into four microstrip lines 36a'–36d' that supply the individual electrodes. The length differentials between microstrip lines 36a'36d' is the same as for lines 36a–36d in FIG. 2, resulting in the same relative RF delays and a consequent synchronization between the electrode energizations and the optical propagation through the modulator.

With four input microstrip lines as illustrated in FIG. 5, if the electrode impedance is 25 ohms the RF input impedance must be 6.25 ohms. Microstrip transformers can be used to bring the input impedance level up to 50 ohms, while limiting the bandwidth. Other types of microstrip line power dividers could also be used, such as 3 dB hybrid couplers or Wilkinson combiners, as described in Ha, *Solid State Microwave Amplifier Designs*, John Wiley & Sons, Inc., 1981, pages 248–260. Such dividers would maintain the desired impedance level while increasing the bandwidth over that of a single transformer.

Figure 6:
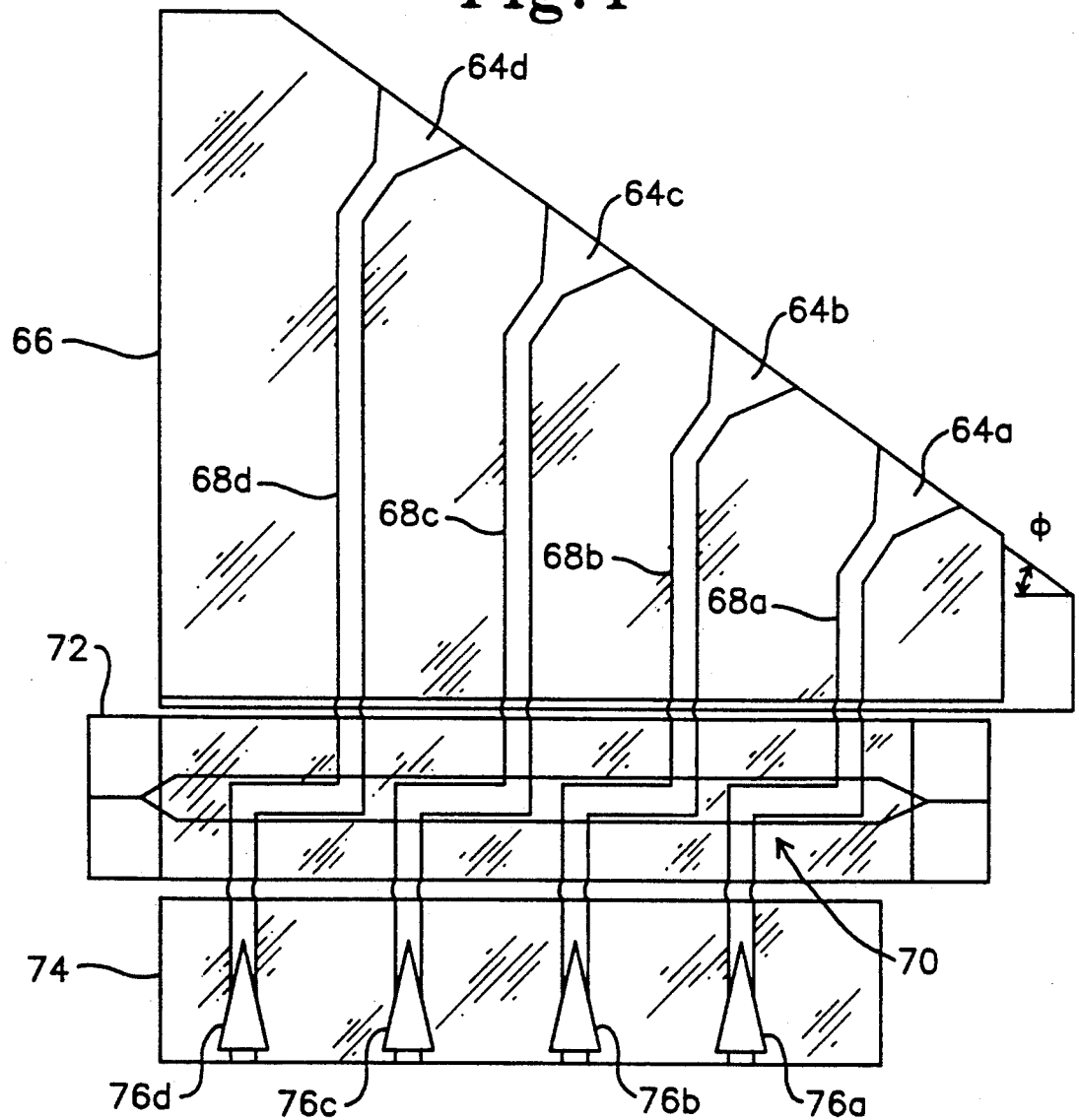
FIGS. 6 and 7 are plan views of two additional embodiments intended for modulating frequencies above 65 GHz.

An alternate configuration is preferred for RF frequencies above 65 GHz. Such a configuration is shown in FIG. 6, in which RF energy is radiated from a source antenna (not shown) into an array of broadband printed circuit horn antennas 64a–64d on an input substrate 66. The received signal is applied by the horn antennas to respective slotline transmission lines 68a–68d on the input substrate 66 to a coplanar optical modulator 70 on an optical substrate 72. Synchronizing time delays are added to the various RF signals by forming the input substrate 66 with an input edge at an appropriate angle $\phi$, as with the previous embodiments. The RF energy is absorbed on a coplanar output substrate 74 by means of slotline loads 76a–76d that are machined from a microwave absorbent material. In this embodiment the modulator segments are fabricated on a Z-cut LiNbO$_3$ substrate.

A single RF transmitting antenna would normally be used to transmit RF signals to the receiving horn antennas 64a–64d. The RF signal preferably arrives at the horn antennas as a plane wave, either by positioning the transmitting antenna at a substantial distance or through the use of wave shaping elements. If there are phase differences between the RF signals arriving at the horn antenna 64a–64d, they may be compensated by adjusting the slotline lengths. The coplanar reception, modulation and termination substrates allow for a more compact and inexpensive modulator than that described in the Bridges et al. article mentioned above, while the separation of the antenna elements 64a–64d from the modulator 70 allows the antenna array to be optimized for efficient RF energy collection independent of the modulator design.

Figure 7:
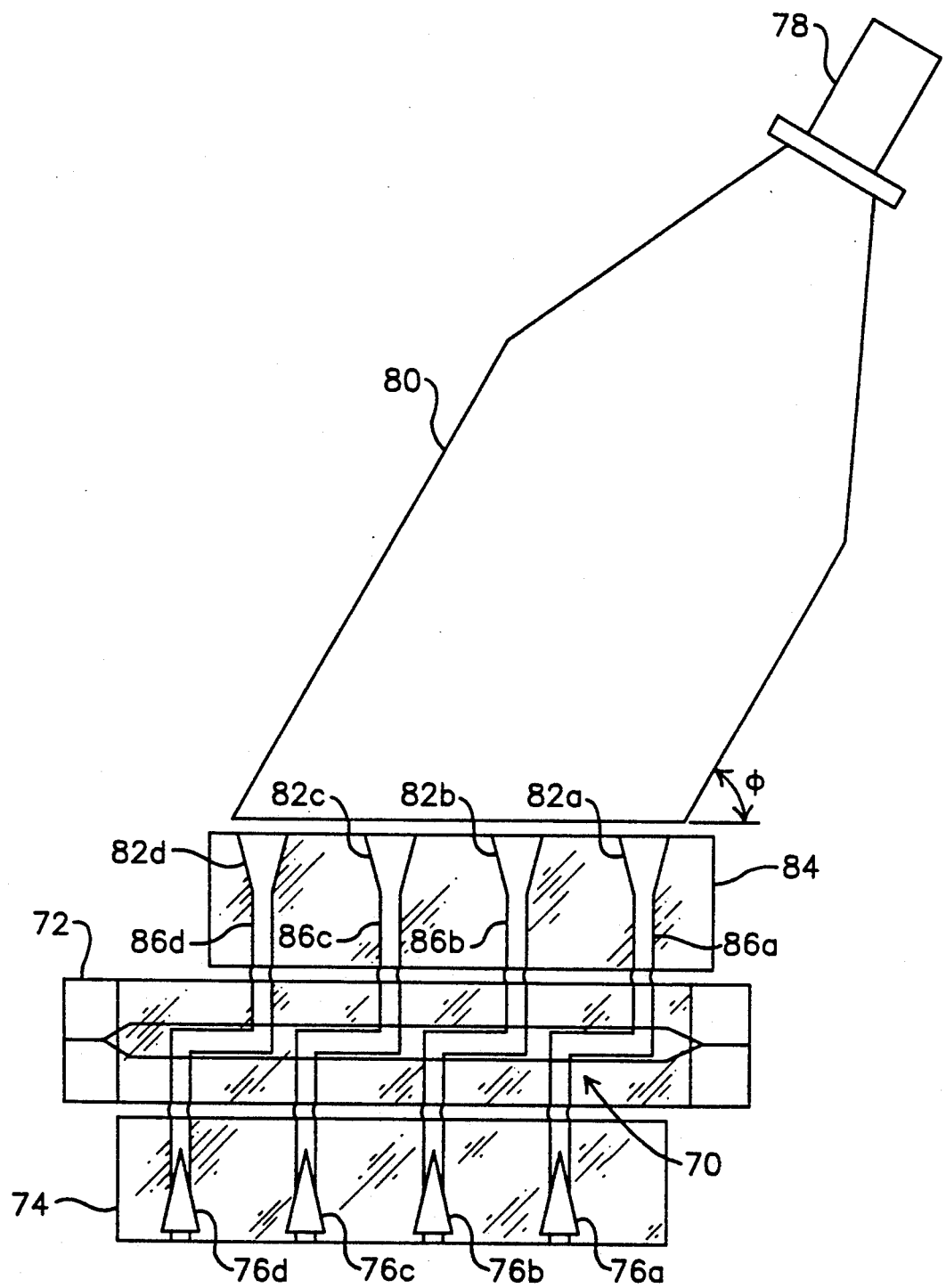

An alternate approach to high frequencies above 65 GHz is illustrated in FIG. 7. In this embodiment the RF signal is launched from a source waveguide 78 and guided by a dielectric waveguide 80 to horn reception antennaes 82a–82d on an input substrate 84. The horn antennas transmit received RF signals to the modulator 70 via equal length slotlines 86a–86d. RF phase delays are established by providing the dielectric waveguide 80, which is coplanar with the other substrates 84, 72 and 74, at the angle $\phi$ to the horn antenna edge of input substrate 84. The RF signals reaching each successive horn antenna 82b–82d thus have to travel a longer distance than the RF signal for the preceding antenna; their separate paths are equivalent to transmitting the RF signals for each of the horn antennas through separate input transmission lines of differing lengths. The substrate for the dielectric waveguide 80 would typically be LiNbO$_3$, with a teflon waveguide.

The invention achieves a desirable combination of wide bandwidth and relatively low power requirements, with a compact generally two-dimensional structure and a reduction in the amount of expensive substrate materials used. Although several illustrative embodiments have been shown and described, numerous variations and alternate embodiments will occur to those skilled in the art. For example, while the invention has been described in terms of a Mach-Zehnder interferometer, it is also applicable to other types of electro-optic modulators. Such variations and alternate embodiments are contemplated, and can be made without departing from the spirit and scope of the invention as defined in the appended claims.

We claim:

1. An electro-optic modulator, comprising:
   a substrate,
   an optical transmission network on said substrate,
   a plurality of separate segmented electrodes distributed in a cascade arrangement on said substrate in the direction of optical transmission for modulating successive respective segments of said optical transmission network, and a plurality of separate modulating signal transmission lines disposed lateral to said optical transmission network for transmitting modulating signals to respective ones of said segmented electrodes to modulate an optical signal transmitted through said optical network, said modulating transmission lines having respective input ends and individual lengths that are selected so that modulating signals applied to the input ends of said modulating transmission lines with a predetermined phase relationship reach their respective electrodes in synchronism with the propagation of an optical signal through said optical transmission network.

2. The electro-optic modulator of claim 1, wherein said modulating transmission lines are provided on a substrate separate from said optical transmission network substrate, with said modulating transmission lines generally coplanar with said optical transmission network, and further comprising respective electrical connector lines for said electrodes on said optical transmission network substrate, and electrical coupling means coupling said modulating transmission lines with respective connector lines.

3. The electro-optic modulator of claim 1, wherein said modulating transmission lines comprise electrical transmission lines that are substantially parallel, with the electrode ends of said transmission lines disposed along a line that is generally parallel to said optical 4. An electro-optic modulator, comprising:
a substrate,
an optical transmission network on said substrate,
respective electrodes on said substrate for successive segments of said optical transmission network, and
modulating signal transmission lines disposed lateral to said optical transmission network for transmitting modulating signals to respective ones of said electrodes to modulate an optical signal transmitted through said optical network, said modulating transmission lines having respective input ends and individual lengths that are selected so that modulating signals applied to the input ends of said modulating transmission lines with a predetermined phase relationship reach their respective electrodes in synchronism with the propagation of an optical signal through said optical transmission network,
wherein said modulating transmission lines comprise electrical transmission lines that are substantially parallel, with the electrode ends of said transmission lines disposed along a line that is generally parallel to said optical transmission network, and the input ends of said transmission lines disposed along a line that is at a predetermined angle to said optical transmission network, said angle being selected to establish respective electrical transmission line lengths that produce electrical signal propagation delays corresponding to said synchronism between the application of electrical signals to said electrodes and the propagation of an optical signal through said optical transmission network, and said angle is defined by $$\tan\phi = \frac{c}{a\sqrt{\epsilon}},$$

where $\phi$ is the angle, c is the speed of light in a vacuum a is the speed of optical propagation through said optical network, and $\epsilon$ is the effective dielectric constant of said electrical transmission lines for said electrical modulating signals.

5. The electro-optic modulator of claim 3, wherein said electrical transmission lines are disposed on a substrate with their input ends proximate to an edge of the substrate, and said substrate edge is at said angle relative to said optical transmission network.

6. The electro-optic modulator of claim 1, wherein the lengths of said modulating transmission lines are selected to receive in-phase electrical signals at their input ends.

7. The electro-optic modulator of claim 1, wherein the input end of each of said modulating transmission lines is connected to a respective radio frequency (RF) signal receiver.

8. The electro-optic modulator of claim 7, wherein the RF signal receiver for each modulating transmission line comprises an electrical cable adaptor.

9. The electro-optic modulator of claim 7, wherein the RF signal receiver for each modulating transmission line comprises an RF receiver antenna.

10. The electro-optic modulator of claim 1, wherein the input ends of said modulating transmission lines are connected to a common radio frequency (RF) receiver, with said transmission lines connected to split the power of an RF signal received by said RF receiver.

11. The electro-optic modulator of claim 1, said modulating transmission lines comprising stripline radio frequency (RF) transmission lines.

12. The electro-optic modulator of claim 1, said segmented optical transmission network comprising a Mach-Zehnder interferometer having a pair of continuous parallel optical transmission lines, with said electrodes disposed relative to successive segments of said optical transmission lines as substantially coplanar extensions of said modulating transmission lines.

13. The electro-optic modulator of claim 12, said modulating transmission lines crossing over said optical transmission lines to their respective electrodes, said modulating and optical transmission lines being separated at said crossovers by an insulating material that prevents the optical signal within said optical transmission lines from spreading to said modulating transmission lines.

14. A Mach-Zehnder interferometric optical modulator, comprising:
a pair of continuous elongate optical transmission lines organized into a plurality of successive segments,
a plurality of mutually discrete segmented source electrodes disposed in cascade in the direction of optical transmission adjacent to said optical transmission lines, with one source electrode for each successive transmission line segment,
respective segmented reference electrodes for each source electrode segment, and
means for applying electrical modulating signals to said electrodes in synchronism with the transmission of optical signals through said optical transmission lines.

15. The optical modulator of claim 14, wherein said optical transmission lines, source electrodes and reference electrodes are disposed on a single continuous substrate.

16. The optical modulator of claim 15, said electrical signal applying means including electrical connector lines on said substrate that extend laterally from their respective electrodes.

17. The optical modulator of claim 16, said electrical connector lines crossing over at least one of said optical transmission lines and being separated therefrom by an insulating material that prevents the optical signal within said optical transmission lines from spreading to said electrical connector lines.

18. A method of modulating an optical signal, comprising:

transmitting said optical signal through an optical transmission network that is disposed on a substrate, applying respective separate electrical modulating signals to successive cascaded segments of said optical transmission network in the direction of optical transmission and in synchronism with the transmission of an optical signal through said network, and supplying said electrical modulating signals to said segments along a plane lateral to said optical transmission network.

19. The method of claim 18, wherein said electrical modulating signals are transmitted along a separate substrate lateral to said optical transmission network substrate before being supplied to said optical transmission network along the network's substrate.

20. A method of modulating an optical signal, comprising:

transmitting said optical signal through an optical transmission network that is disposed on a substrate, applying respective electrical modulating signals to successive segments of said optical transmission network in synchronism with the transmission of an optical signal through said network, and supplying said electrical modulating signals to said segments along a plane lateral to said optical transmission network, wherein said electrical modulating signals are transmitted along respective signal paths that are generally coplanar with said optical transmission network, the respective lengths of said paths being selected so that input modulating signals that have a predetermined phase relationship arrive at said optical transmission network in synchronism with the transmission of an optical signal through said network.

21. The method of claim 20, wherein multiple electrical modulating signals with a predetermined phase relationship are transmitted along respective discrete signal paths to said optical transmission network segments.

22. The method of claim 20, wherein a single electrical modulating signal is divided among said signal paths for transmission to said optical transmission network segments.

23. The method of claim 18, said optical transmission network comprising a Mach-Zehnder interferometer having a pair of parallel optical transmission lines, wherein said electrical modulating signals are applied to produce differences between the optical transmission speeds of said optical transmission lines.

* * * * *